United States Patent [19]

Emmett et al.

[11] Patent Number: 4,734,788
[45] Date of Patent: Mar. 29, 1988

[54] SINGLE PASS ELECTROSTATIC COLOR PRINTER/PLOTTER HAVING STRAIGHT PAPER PATH

[75] Inventors: David M. Emmett, Palo Alto; Robert L. Nieto, Concord, Camacho; Joseph; Joseph Camacho, San Jose, all of Calif.

[73] Assignee: Benson, Inc., Mountain View, Calif.

[21] Appl. No.: 904,137

[22] Filed: Sep. 5, 1986

[51] Int. Cl.$^4$ .................... H04N 1/23; G03G 15/01; G01D 15/14
[52] U.S. Cl. ................................ 358/300; 358/296; 101/DIG. 13; 101/131; 355/4; 346/160; 346/153.1
[58] Field of Search ............... 346/74.7, 153.1, 155, 346/157, 160.1; 358/296, 300; 355/4; 101/DIG. 13, 131

[56] References Cited

U.S. PATENT DOCUMENTS 4,286,031  8/1981  Kuehnle et al. ............... 101/131 X
4,569,584  2/1986  St. John et al. ............ 101/DIG. 13 X
4,627,701  12/1986  Onoda et al. ................... 355/3 CH Primary Examiner—E. A. Goldberg
Assistant Examiner—Linda M. Peco
Attorney, Agent, or Firm—Theodore S. Park; James F. Hann; Robert C. Colwell

[57] ABSTRACT

A color printer/plotter includes a frame having a paper inlet, a number of print stations, and a paper outlet. The paper is pulled past the print stations by a single driver at the paper outlet. Each print station includes a electrostatic charging head having a flat charging surface against which a first roller, typically having a foam outer surface, presses with the paper therebetween. Immediately downstream of the charging head a toner roller supplies toner to the paper, the toner adhering to the charged areas on the paper. A second pressure roller presses the paper against the toner roller. The second pressure roller is offset slightly upstream of the center of the toner roller to aid toner roller-paper contact. The sizing and positioning of the toner and second pressure rollers is such so as not to significantly deflect the paper from the substantially straight paper path between the paper inlet and paper outlet. Registrations marks are printed along the lateral edges of the paper to allow the printer/plotter to compensate for any lateral shifting or longitudinal stretching of the paper.

26 Claims, 5 Drawing Figures

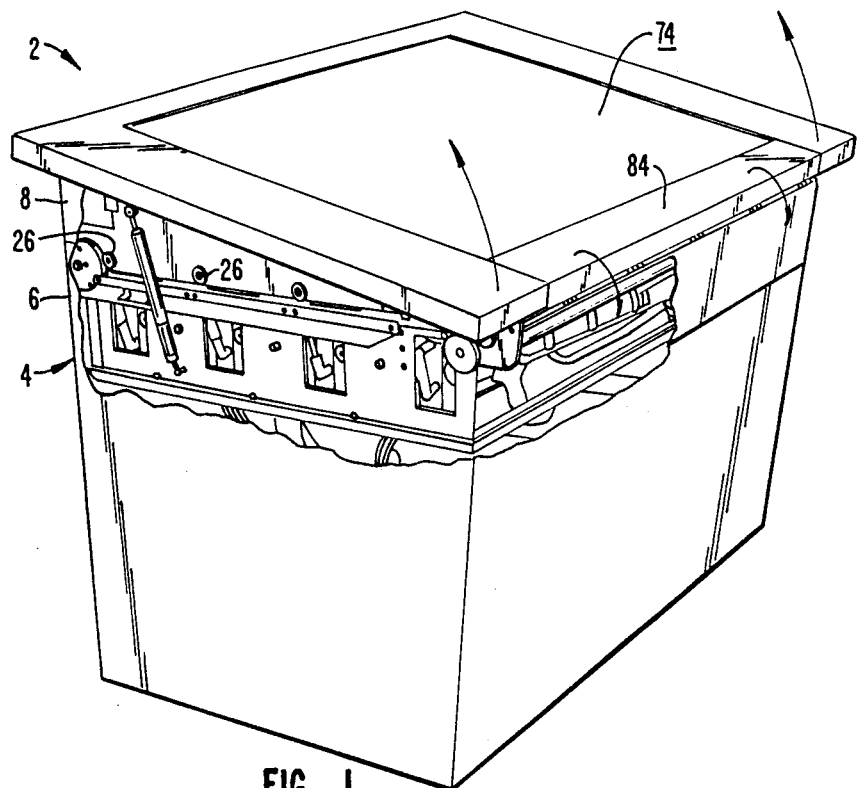
FIG._1.
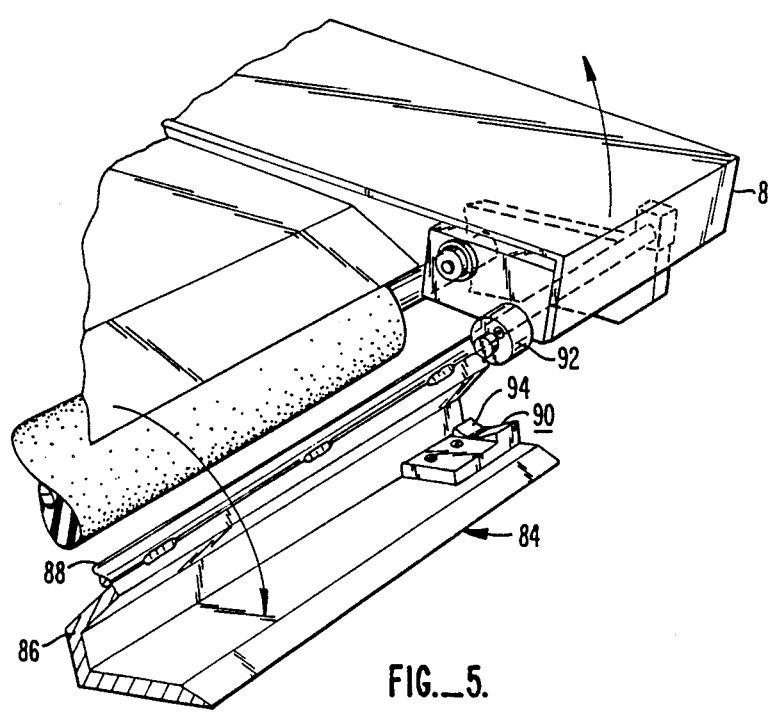
FIG._5.

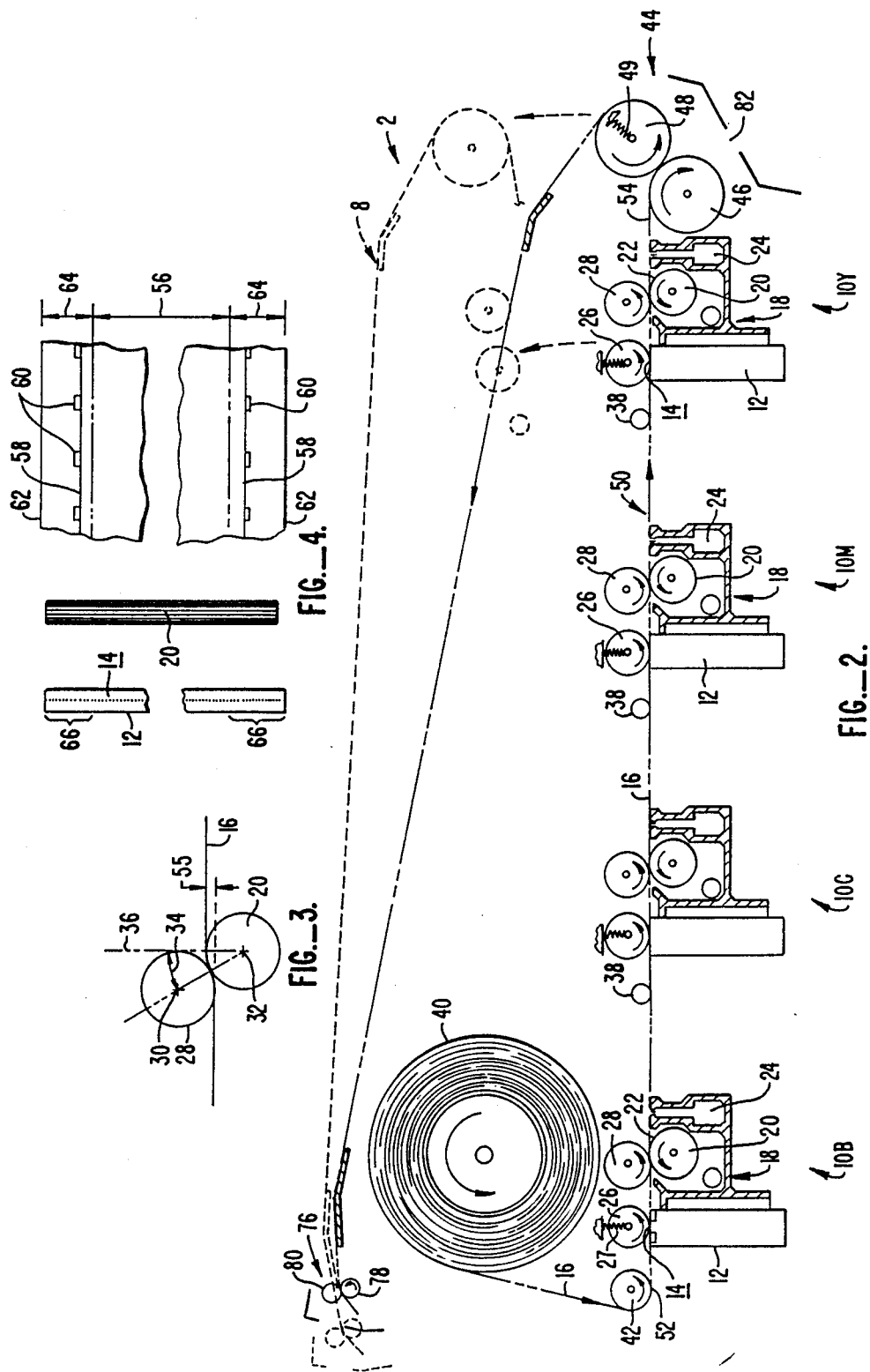

SINGLE PASS ELECTROSTATIC COLOR PRINTER/PLOTTER HAVING STRAIGHT PAPER PATH

BACKGROUND OF THE INVENTION

Electrostatic color printers/plotters, usually referred to in this application as simply printers, work by passing a print medium, typically MYLAR ® plastic film or paper, over or under a series of charged stylii of an electrostatic charging head. This creates small charged areas on the paper. Subsequently a toner is applied to the paper, the toner adhering firmly to the charged areas. Excess toner is removed by a vacuum chamber downstream of where the toner is applied.

Electrostatic color printers/plotters can be constructed in several ways. One system uses a single charging head and three or four toner stations, one for each color. (Although theoretically three colors, yellow, cyan and magenta can be combined to form black, to get a better black a separate black toner station is often used.) The paper is passed through the printer once for each color to be applied to the paper. Therefore, these printers require the paper to be cycled through the printer four times. This, of course, is quite time consuming. Also, the paper has a tendency to become misaligned so unless such misalignment is compensated for, image quality can be impaired.

One way to eliminate some of the problems associated with the multiple-pass color printers is shown in U.S. Pat. No. 3,523,158. The printer shown there has a single electrostatic charging head and three serially-aligned toner positions. The charging stylii in the charging head are arranged in groups of three, one for each of the primary colors. The downstream toner stations do not provide toner to the entire width of the paper but only to narrow bands corresponding to the positions of the stylii for the corresponding color. Thus, if one were to print all three colors simultaneously, one would end up with very narrow strips or bands of the three colors, alternating red, green, blue, red, green, etc. While this solves many of the problems of the multiple-pass printers, image quality is necessarily limited.

Another type of single-pass electrostatic color printer/plotter uses a number of print stations, each with its associated paper drive. It has been found necessary to use several paper drives because of the large drag exerted on the paper as it travels along its circuitous path through each print station. However, providing separate paper drives for each print station increases the mechanical complexity, the size of the printer and the complexity of the control circuitry. Furthermore, the paper is prone to stretching when traversing such paths. An example of such a printer/plotter is shown in U.S. patent application Ser. No. 722,497, entitled "Single-Pass Color Plotter" filed on Apr. 12, 1985.

SUMMARY OF THE INVENTION

The invention is directed to a single pass electrostatic color printer/plotter which is compact, relatively simple in construction and in ease of control, and can be sold at a reasonable cost by virtue of its use of a substantially straight media path through the printer/plotter and a single media driver. The paper path alleviates much of the paper distorting force imposed in prior art apparatus.

The printer includes a frame defining a substantially straight media path between a media inlet and a media outlet. The printing medium, typically MYLAR ® plastic film or paper, is supplied to the media inlet, such as from a roll. The paper is pulled along the media path by a single media driver at the media outlet. The media driver is, in the preferred embodiment, a drive and pinch roller combination.

Printing is accomplished at a number of print stations, typically four, mounted to the frame and positioned serially along the media path. Each print station includes an elongate electrostatic charging (or writing) head extending transversely, preferably perpendicularly, to the paper. The charging head is of the type having many stylii extending therethrough to provide, typically, thousands of charging positions along a flat charging surface aligned with and adjacent the paper. As the paper passes the charging head, small charged media regions corresponding to the cross-section of a stylus are created where the toner is to adhere.

The print stations also include a toner application assembly located immediately downstream from the charging head. The toner application assembly includes a toner roller for applying toner to the charged surface of the media. Excess toner is removed by a vacuum system immediately downstream of the toner roller. Between each print station is an electrostatic charge discharging bar against which the paper rubs to remove any remaining charge on the paper before it reaches the next printing station.

To ensure the electrostatic charges are properly applied to the paper, a roller is mounted directly opposite the charging head and slightly biases the paper, or other print medium, against the charging head. Also, a second roller is used to ensure the paper makes satisfactory contact with the toner roller where toner is applied as the paper passes the toner roller. The second roller is also slightly biased, typically by virtue of its own weight, against the toner roller and is positioned slightly upstream or behind the toner roller to create a small angle of wrap about the toner roller, such as about 30°. This positioning, however, is not enough to have the paper deviate from its substantially straight media path.

One of the primary aspects of the invention is the recognition by keeping the media path substantially straight, coupled with the use of registration indicia along the edges of the paper (which allows the printer to compensate for paper shifts, stretching, and so forth), a single media driver may be used. The use of a single media driver provides several advantages, including the elimination of parts and the reduction of complexity present when each print station has its own driver. It also reduces the control problems associated with synchronizing multiple drives and tensioning between such drives. Furthermore, a single drive allows the printer to be much more compact. These advantages all combine to make the machine less complicated and less expensive, without sacrificing print quality, when compared with printers having serpentine media paths through each of several print stations, each print station having its separate media driver.

Another significant feature of the invention is the use of the pressure roller with the toner roller, the pressure roller preferably being positioned slightly upstream or behind the toner roller. It has been found that use of this roller, which lightly biases the paper against the toner roller, keeps the paper flat as it passes the toner roller. This helps to eliminate imperfect images which can be caused by slight rippling of the paper as it is pulled through the printer by the media driver. The angle of wrap is small enough to maintain a substantially straight media path so to allow a single media driver to be used.

At each print station the first roller, associated with the charging head, and the second roller, associated with the toner roller, lightly bias the media against the charging head and toner roller, respectively. It has been found that a first roller, covered with a foam layer, and biased against the charging head at a rate of about 18 to 50 grams per centimeter of length, works well. In the preferred embodiment the second roller weighs about 1350 grams and is about 90 centimeters long for a force of about 15 grams per centimeter of length. Thus, as used in this application lightly biased refers to forces per unit length similar to the above values for a four-station printer using report grade, translucent and velum papers having weights from about 43 to 53 pounds per 3,000 square feet as the print medium. Use of a heavier, stronger printing medium may permit, or even require, greater biasing forces to be used by the two pressure rollers against the charging head and the toner roller.

Other features and advantages of the present invention will appear from the following description in which the preferred embodiment has been sent forth in detail in conjunction with the accompanying drawings.

BRIEF DESCRIPTION OF THE DRAWINGS

FIG. 1 is an overall perspective view of a single-pass, electrostatic color printer/plotter made according to the invention.

FIG. 2 is a side schematic view of the printer/plotter of FIG. 1.

FIG. 3 illustrates the angular offset relationship between a toner roller and a first pressure roller of FIG. 2.

FIG. 4 is a top view of a portion of the paper of FIG. 2.

FIG. 5 is a perspective view of a portion of the printer/plotter of FIG. 1 with the top latch disengaged from the top.

DETAILED DESCRIPTION OF THE PREFERRED EMBODIMENT

Turning now to the FIGS. 1 and 2, a single-pass, electrostatic color printer/plotter 2, includes a frame 4 having a base 6 and a top 8. Four print stations 10B, 10C, 10M and 10Y, the letters referring to black, cyan, magenta and yellow, are mounted to base 6. Each print station 10 is substantially the same so that initially only print station 10Y will be described. Print stations 10 are described in more detail in U.S. patent application Ser. No. 794,910, entitled "Compact Toner Station," and filed on Nov. 4, 1985. Print station 10Y includes a charging head 12 having a nearly flat charging surface 14 along which paper 16 passes. Print station 10Y also includes a toner assembly 18 including a toner roller 20 rotated in a direction opposite the direction of travel of paper 16. Toner roller 20 is positioned so that its circumference 22 is generally tangent surface 14. Toner roller 20 includes many fine longitudinal grooves which hold toner sprayed onto roller 20. Toner assembly 18 includes a vacuum chamber 24 downstream of toner roller 20 for removing excess toner from paper 16; toner will remain only at the regions of paper 16 where a charge is placed on the paper by charging head 12.

A first pressure roller 26, typically having a foam outer surface, is mounted to top 8 directly above substantially flat charging surface 14 of charging head 12. Roller 26 is lightly biased against surface 14 by springs 27 at a force of about 18 to 50 grams per centimeter of length of roller 26. A second pressure roller 28 is mounted to top 8 of frame 4 above but slightly upstream of toner roller 20. Pressure roller 28 is also lightly biased against toner roller 20 at a force of about 15 grams per centimeter. This light biasing is, in this disclosed embodiment, produced by the weight of second pressure roller 28.

As can be seen in FIG. 3, the center 30 of second pressure roller 28 is offset from the center 32 of toner roller 20 by an angle 34 of about 30° from a vertical line 36 extending through center 32 and generally perpendicular to paper 16. The light biasing and offset positioning of second pressure roller 28 helps to ensure the flat, intimate contact of paper 16 against toner roller 20 without causing paper 16 to deviate to any substantial degree from the substantially straight paper path through print station 10Y and without creating a substantial drag on paper 16 as it moves through print station 10Y.

Downstream from toner assemblies 18 of each printer station 10B, 10C and 10M is a discharge bar 38 against which paper 16 rubs as it passes by. Discharge bar 38 allows any remaining charge on paper 16 to be dissipated to eliminate ghosting and other defects in the image. No discharge bar 38 is needed following the final printing station 10Y.

Paper 16 progresses through printer 2 from a paper roll 40, mounted to top 8, past an entrance spindle 42, mounted to base 6, past the four print stations 10B, 10C, 10M and 10Y, and to a paper drive assembly 44. Assembly 44 includes a drive roller 46, mounted to base 6, and a pinch roller 48, mounted to top 8. Paper roll 40 has a drag exerted on it to provide an appropriate tension on paper 16 as it enters print station 10B and to keep roll 40 from spinning freely. Pinch roller 48 is resiliently biased against drive roller 46 by a spring 49 at each end. Upon rotation of drive roller 46, paper 16 is pulled from paper roll 40, past spindle 42, past print stations 10B, 10C, 10M and 10Y and finally through drive assembly 44.

As is evident from FIGS. 2 and 3, printer 2 has a substantially straight paper path 50 from a paper entrance 52 at spindle 42 to a paper exit 54 at drive assembly 44. Avoiding a serpentine path for paper 16 permits a single paper drive assembly 44 to be used to pull paper 16 past each of the four print stations 10, thus eliminating the need for a separate drive at each print station 10 so that size and complexity, and thus cost, are reduced. The single drive also eliminates the need for synchronized control of different drives.

The maximum deflection of paper 16 between paper entrance 52 and paper exit 54 is the vertical deflection 55. Assuming a combined radius of about 6 to 6.3 cm, deflection 55 is equal to about 0.8 to 0.85 cm. Path 50 between print stations 10B and 10Y is about 57 cm long or about 19 cm per print station 10. Therefore the deviation distance per media path length per print station ratio, called the path deviation ratio, is about 1 to 23.

Because print media, such as paper 16, can and often will stretch and shift as it passes along paper path 50, the image area 56 of paper 16, shown in FIG. 4, is registered using lateral registration lines 58 and periodic registration marks 60 along the lateral edges 62 of paper 16 outside of image area 56. This can be accomplished in several different ways. For example, U.S. patent application Ser. No. 722,497 for "Single-Pass Color Plotter," filed Apr. 12, 1985, shows a printer/plotter in which visible registration lines and marks are printed on one side of the paper passing through the machine. Optical sensors are used at each print station to continually recalculate, if necessary, the precise printing positions for that print station. Another method uses a non-visible registration indicia. For example, invisible magnetic indicia could be "printed" as the registration lines and marks. U.S. patent application Ser. No. 880,988, entitled "Invisible Marking Scheme for Single Pass Plotter," filed July 2, 1986, shows the use of charged regions acting to register the print media.

With the present invention, charging head 12 of print station 10B is made to extend under the registration areas 64 on either side of image area 56. See FIG. 4. The extended regions 66 of charging head 12 at print station 10Y provide the appropriate charged areas on paper 16 as it passes. The other components of print station 10B are of sufficient length to enable print station 10B to print in both image area 56 and registration areas 46. The remaining print stations 10C, 10M and 10Y are sized to print in image area 56 only.

Paper 16, after leaving drive assembly 44, is directed over the top surface 74 of top 8. This allows the user to view the printed image in image area 56 substantially immediately after printing. Paper 16 is pulled up inclined top surface 74 by a tugger roller assembly 76 including a driven tugger roller 78 and a free-wheeling pinch roller 80. If desired, paper 16 could be directed through an opening 82 beneath top 8 so that no tugger roller assembly 76 would be needed. Also, a driven take-up roller, not shown, could be used in lieu of tugger roller assembly 76.

As indicated by the arrows in FIGS. 1, 2 and 5, top 8 is movable between lowered position, shown in FIG. 1, and a raised position. FIG. 2, in dashed lines, shows top 8 partially raised. To latch top 8 to base 6, a pivotal latch 84, shown in FIGS. 1 and 5, is used. Latch 84 is an elongate member with a generally L-shaped cross-sectional shape. One leg 86 of latch 84 is spot welded to a rod 88. Rod 88 is pivotally mounted to base 6 so latch 84 can pivot between its unlatched position of FIG. 5 and its latched position of FIG. 1. Latch 84 includes a camming surface 90 at each end which engage cam rollers 92 pivotally secured to top 8. As latch 84 is pivoted from its unlatched to its latched positions, camming surfaces 90 engage cam rollers 92 to force top 8 towards base 6. Surface 90 includes a detent region 94 which, once cam roller 92 is engaged in region 94, secures latch 84 in its latched position to secure top 8 to base 6.

In use, paper 16 is directed from paper roll 40 past entrance spindle 42, past print stations 10B, 10C, 10M and 10Y and over drive roller 46. Top 8 is then placed down upon and secured to base 6 by latch 84 to secure paper 16 along paper path 50. Paper drive assembly 44 is then actuated to pull paper 16 taut along paper path 50 until a sufficient length of paper 16 has been drawn from paper roll 40 so that paper 16 passes between tugger and pinch rollers 78, 80. The control of printer 2 is then transferred to an external source of printer information, not shown, to control the passage of paper 16 through printer 2 while images are printed in image area 56 by print stations 10B, 10C, 10M and 10Y. Registration lines 58 and registration marks 60 are printed at print station 10B. The registration lines 58 and marks 60 permit the proper registration of the image portions printed by print stations 10B, 10C and 10M with the image printed by the downstream print stations 10C, 10M and 10Y.

The provision of substantially straight paper path 50 and the use of lightly biased pressure rollers 26, 28 result in the ability to use a single paper drive assembly 44 to pull paper 16 past all four print stations 10 without sacrificing print quality. In particular, the use of second pressure roller 28 offset at an angle 34 of about 30° with a path deviation ratio in the neighborhood of about 1 to 23 or more ensures appropriate contact of paper 16 with toner roller 20 without the excess drag created when paper passes along a serpentine paper path.

Modifications and variations can be made to the disclosed embodiment without departing from the subject of the invention as defined in the following claims. For example, a print medium other than paper 16 could be used. A greater or lesser number of print stations 10 could be used as well.

We claim:

1. A single pass electrostatic color printer/plotter comprising:
   a frame having a media inlet and a media outlet;
   a media supply for providing a length of a medium, having first and second generally parallel lateral edges, to the media inlet;
   a single media driver at the media outlet for pulling the medium in a forward direction only from the media inlet to the media outlet; and
   a printing assembly including a plurality of print stations mounted to the frame and positioned along a substantially straight media path between the media inlet and the media outlet, the print stations each adapted to minimize any deviation of the medium from the substantially straight media path.

2. The printer/plotter of claim 1 wherein the print stations each include:
   an elongate electrostatic charging head, including a charging surface aligned with the media path, oriented generally perpendicular to the forward direction;
   a toner application assembly, downstream of the charging head, including an elongate rotatable toner roller with an axis generally perpendicular to the forward direction and having a circumferential surface generally tangent to the media path;
   a first roller, positioned directly opposite and parallel to the charging surface, for lightly biasing the medium against the charging surface of the charging head; and
   a second roller, positioned opposite the toner roller, for lightly biasing the medium against the charging head, the second roller having an axis parallel to but vertically offset from the toner roller axis.

3. The printer/plotter of claim 2 wherein the second roller axis is slightly upstream of the toner roller axis.

4. The printer/plotter of claim 2 wherein the line connecting the second roller axis and the toner roller axis makes an angle of about 60° to the substantially straight media path.

5. The printer/plotter of claim 1 wherein the print stations are adapted to provide a deviation ratio, defined as the ratio of the maximum actual deviation of the medium at any position along the substantially straight media path to a quantity equal to $L \div (n-1)$, where L is the length of the substantially straight media path and n is the number of the print stations, the deviation ratio being at least about 1 to 23.

6. The printer/plotter of claim 2 wherein the print stations are adapted to provide a deviation ratio, defined as the ratio of the maximum actual deviation of the medium at any position along the substantially straight media path to a quantity equal to $L \div (n-1)$, where L is the length of the substantially straight media path and n is the number of the print stations, the deviation ratio being at least about 1 to 23.

7. The printer/plotter of claim 6 wherein the position of maximum deviation is at the toner roller.

8. The printer/plotter of claim 2 wherein each print station includes an excess toner remover, downstream of the toner application assembly, for removing excess toner from the medium.

9. The printer/plotter of claim 1 including a first print station toward the media inlet, a last print station toward the media outlet and at least one intermediate print station therebetween.

10. The printer/plotter of claim 9 further comprising a charge discharge member positioned along the media path between each print station and in contact with the medium.

11. The printer/plotter of claim 10 wherein the charge discharge member is non-rotatable so that the medium rubs against the charge discharge member.

12. The printer/plotter of claim 10 wherein the charge discharge member is an elongate bar positioned generally perpendicular to the forward direction.

13. The printer/plotter of claim 1 wherein the media driver includes a driver roller and pinch roller between which the medium passes.

14. The printer/plotter of claim 1 further comprising a supplemental media driver downstream of the media driver.

15. The printer/plotter of claim 1 wherein the frame includes a movable top covering the media path, the top movable between raised and lowered positions.

16. The printer/plotter of claim 15 wherein the first and second rollers are mounted to the top.

17. The printer/plotter of claim 15 wherein the media driver includes a drive roller and a pinch roller between which the medium passes.

18. The printer/plotter of claim 17 further comprising means for resiliently mounting the pinch roller to the top so to bias the pinch roller against the drive roller when the top is in the lowered position.

19. The printer/plotter of claim 18 further comprising cam latch means for securing the top in the lowered position.

20. The printer/plotter of claim 1 further comprising supplemental printing means for providing registration indicia along the first lateral edge.

21. The printer/plotter of claim 20 wherein the registration indicia are visible.

22. The printer/plotter of claim 20 wherein the registration indicia include a straight line and a series of spaced apart marks.

23. A single pass electrostatic color printer/plotter comprising:
a frame having a media inlet and a media outlet;
a media supply for providing a length of medium, having first and second generally parallel lateral edges, to the media inlet;
a media driver at the media outlet for pulling the medium in a forward direction from the media inlet to the media outlet; and
a printing assembly including a plurality of print stations mounted to the frame and positioned along a substantially straight media path between the media inlet and the media outlet, the print stations each including:
an elongate electrostatic charging head, including a flat charging surface aligned with the media path, oriented generally perpendicular to the forward direction;
a toner application assembly, downstream of the charging head, including an elongate rotatable toner roller with an axis generally perpendicular to the forward direction and having a circumferential surface generally tangent to the media path;
a first roller, positioned directly opposite and parallel to the charging surface, for lightly biasing the medium against the charging surface of the charging head; and
a second roller, positioned opposite the toner roller, for lightly biasing the medium against the charging head, the second roller having an axis parallel to but slightly upstream of the toner roller axis so to deflect the medium at the toner roller a selected deviation, the selected deviation being the maximum deviation along the media path, provide a deviation ratio, defined as the ratio of the maximum deviation of the medium to a quantity equal to $L \div (n-1)$, where L is the length of the media path and n is the number of the print stations, of at least about 1 to 23.

24. The printer/plotter of claim 23 wherein the frame includes a movable top covering the media path, the top movable between raised and lowered positions.

25. The printer/plotter of claim 24 further comprising cam latch means for securing the top in the lowered positions.

26. The printer/plotter of claim 2 wherein the second roller axis is vertically offset of the toner roller.

* * * * *